United States Patent [19]

Linscott, Jr.

[11] 4,203,044

[45] May 13, 1980

[54] DOUBLE-WALLED ROTOR FOR AN OIL-COOLED ELECTRICAL MACHINE

[75] Inventor: Phillip S. Linscott, Jr., Rockford, Ill.

[73] Assignee: Sundstrand Corporation, Rockford, Ill.

[21] Appl. No.: 869,756

[22] Filed: Jan. 16, 1978

[51] Int. Cl.² ............................................. H02K 1/32
[52] U.S. Cl. .................................... 310/61; 310/68 D
[58] Field of Search ...................... 310/52, 54, 58–61, 310/68 R, 68 D, 57, 64, 65, 261, 264, 265, 40 R, 53, 63

[56] References Cited

U.S. PATENT DOCUMENTS

| 2,894,155 | 7/1959 | Labastie | 310/54 |
|---|---|---|---|
| 3,145,314 | 8/1964 | Becker | 310/68 R |
| 3,480,810 | 11/1969 | Potter | 310/54 |
| 3,648,085 | 3/1972 | Fujii | 310/54 |
| 3,733,503 | 5/1973 | Potter | 310/68 R |
| 3,991,588 | 11/1976 | Laskaris | 310/54 |
| 4,018,059 | 4/1977 | Hatch | 310/54 |

Primary Examiner—R. Skudy
Attorney, Agent, or Firm—Wegner, Stellman, McCord, Wiles & Wood

[57] ABSTRACT

An interchangeable tube is disposed and retained within a hollow rotor shaft of an electrical machine to form an axially extending cavity between the tube and the hollow rotor shaft. Oil flows into the tube from an oil supply, through holes in the tube, and into the cavity, and is sprayed from holes in the hollow shaft for cooling and lubricating the electrical machine. The configurations of the hollow rotor shaft and the interchangeable tube facilitate removal of the tube from the hollow rotor shaft without complete disassembly of the electrical machine. Thus, tubes having different hole diameters and hole configurations can be interchanged to accommodate different oil flow requirements and different oil pressures established by constant speed drives or auxiliary power units coupled to the electrical machine.

12 Claims, 3 Drawing Figures

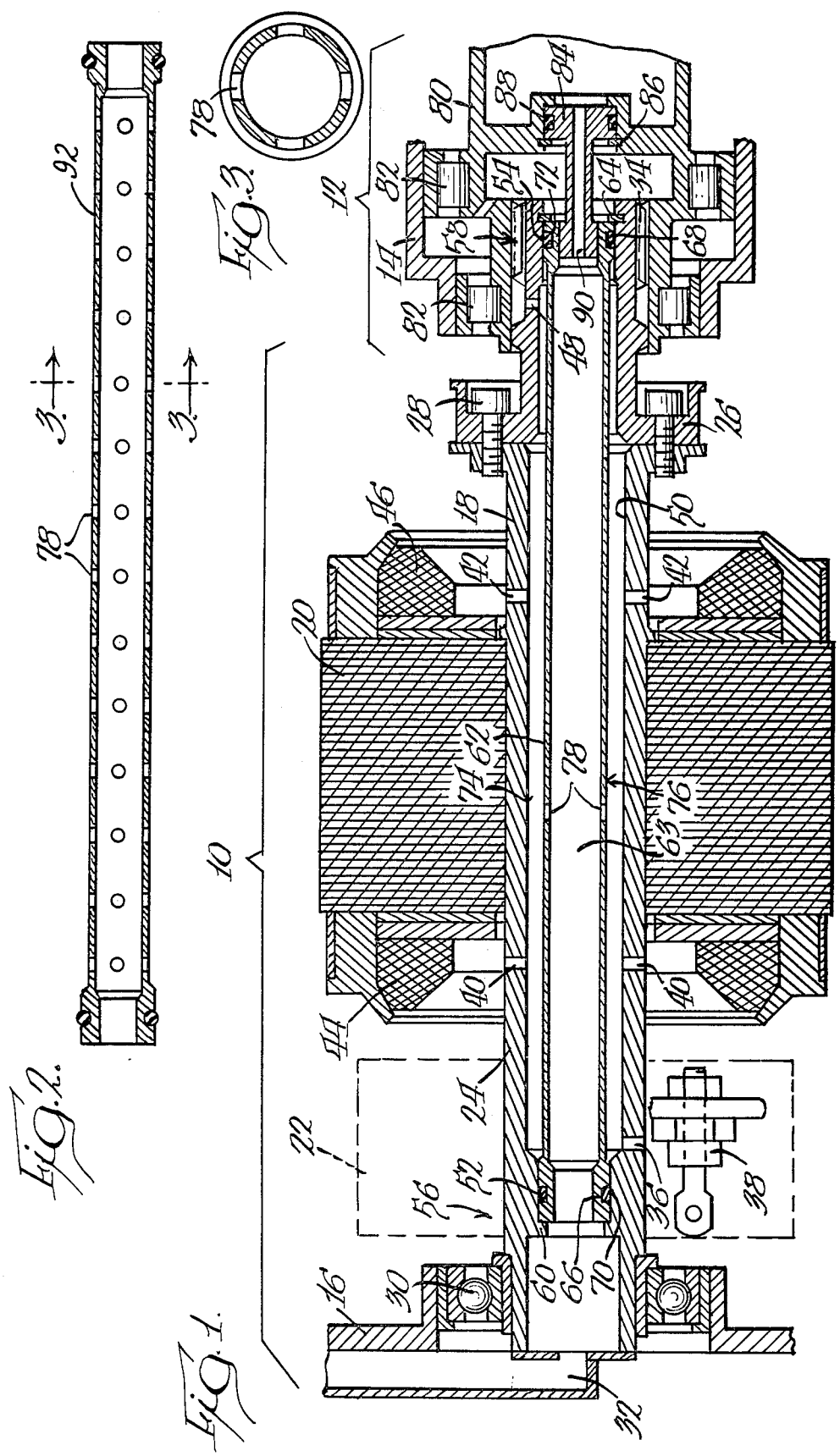

DOUBLE-WALLED ROTOR FOR AN OIL-COOLED ELECTRICAL MACHINE

BACKGROUND OF THE INVENTION

This invention relates to electrical machinery and, more particularly, to an improved rotor assembly for AC generators.

AC generators are often used for various applications. For example, a generator may be mechanically coupled to and driven by a constant speed drive unit which provides rotational energy to the rotor of the generator at a constant speed. Alternatively, the generator may be coupled to an auxiliary power unit. When an AC generator is coupled to a selected constant speed drive or auxiliary power unit to form a power system, it is typical in such a system to circulate oil through the generator for lubricating and cooling. Generally, oil enters the generator through one end of a hollow rotor shaft from an oil supply. The oil flows through the shaft and out its other end. The oil pressure at each end of the hollow rotor shaft should be substantially the same.

The hollow rotor shaft carries the field winding structure and the rectifier assembly for rectifying the voltage from the exciter windings. The shaft is provided with holes through which oil flows for lubricating and cooling portions of the generator. For example, holes may be located near the field winding structure so that an oil spray from the holes impinges upon end turns of the field winding structure for cooling. Also, holes may be provided near the rectifier assembly for cooling the diodes in the assembly. Moreover, holes through which oil flows may be placed along the shaft for lubricating selected portions, as for example, a splined end of the shaft of the generator which receives the constant speed drive or the auxiliary power unit.

The volume of oil flow through the holes in the hollow rotor shaft should be maintained at a selected level for optimum operation. Furthermore, the velocity of the oil spray from the holes should be controlled to minimize erosion of the insulation on end turn windings of the field winding structure.

Different constant speed drives and auxiliary power units have different oil inlet pressures and oil flow requirements which must be maintained. Therefore, before an AC generator is coupled to a particular constant speed drive or auxiliary power unit, the rotor must often be disassembled and the diameter and number of the holes in the hollow rotor shaft must be changed to assure that the oil inlet pressures and oil flow requirements are matched so that the constant speed drive or auxiliary power unit and the AC generator cooperate effectively with each other. Rotor disassembly and replacement is time-consuming and expensive.

SUMMARY OF THE INVENTION

In accordance with the present invention, a removable hollow tube is disposed within a hollow rotor shaft and extends from substantially one end of the hollow rotor shaft to the other. Cooling oil flows from an oil supply through the hollow tube into a constant speed drive or auxiliary power unit coupled to the generator. The outer surface of the hollow tube and the inner surface of the hollow rotor shaft define a cavity extending axially along the shaft. The tube is provided with holes so that oil flows into the cavity and out the holes in the hollow rotor shaft for cooling and lubricating portions of the generator. The diameter and number of holes in the hollow tube are selected in accordance with the inlet pressure provided by the selected auxiliary power unit or constant speed drive connected to the generator or in accordance with a desired flow volume of the oil through the holes.

The configurations of the hollow rotor shaft and the hollow tube facilitate removal of the tube from the shaft without complete disassembly of the AC generator so that a tube having a selected hole configuration can be inserted within the shaft for accommodating a particular oil inlet pressure and oil flow requirement.

It is a feature of the present invention to provide an improved rotor structure adapted to an interchangeable tube for an AC generator so that the AC generator may readily be modified for use with various constant speed drives or auxiliary power units having different oil inlet pressures and oil flow requirements.

Another feature of the invention is to provide an improved rotor structure for an AC generator having a configuration which facilitates removal of the tube without extensive disassembly of the generator.

DRAWING

FIG. 1 is a cross-sectional view of a generator rotor having a hollow rotor shaft with a removable tube therein, coupled to a constant speed drive;

FIG. 2 is a longitudinal sectional view of another tube in accordance with the present invention; and FIG. 3 is a cross-sectional view taken along line 3—3 of FIG. 2, showing a set of holes in the tube.

DESCRIPTION OF THE PREFERRED EMBODIMENT

Referring to FIG. 1, generator 10 is coupled to a constant speed drive 12 having housing 14. Although the description herein will be limited to the combination of the AC generator 10 and the constant speed drive 12, it is apparent that generator 10 could be coupled to other equipment as, for example, an auxiliary power unit.

Generator 10 includes a housing 16, a hollow rotor shaft 18 carrying field winding structure 20, and rectifier assembly 22. The hollow rotor shaft 18 may of of a two-piece construction including a hollow elongated member 24 and a hollow coupling member 26 secured to hollow elongated member 24 by screws 28. The shaft is mounted for rotation within generator 10 by bearings 30 at the left end, as shown in FIG. 1, and by the constant speed drive 12 at the right end, as will be explained in detail below.

Generator 10 includes an oil inlet 32 through which oil enters from an oil supply (not shown). Oil flows through hollow rotor shaft 18 and into constant speed drive 12 and returns to the oil supply.

Hollow rotor shaft 18 is provided with a splined end 34 which is adapted to be received by the constant speed drive 12.

Holes or sets of holes are provided along the hollow rotor shaft 18 to direct oil onto parts of the generator 10 which require cooling. Hole 36 extends through hollow rotor shaft 18. Oil from hole 36 cools diode 38 in rectifier assembly 22. Similarly, spaced-apart sets of holes 40 and 42 extend through hollow rotor shaft 18. Oil from holes 40 and 42 cool exposed end turns 44 and 46 of field winding structure 20.

Additional holes may be provided in hollow rotor shaft 18 for lubrication purposes. Hole 48 provides oil flow to splined end 34.

Inner surface 50 of hollow rotor shaft 18 has sealing surfaces 52 and 54 of a reduced diameter at ends 56 and 58, respectively. End 56 is provided with a shoulder 60 adjacent sealing surface 52 for positioning hollow tube 62.

When generator 10 is removed from the constant speed drive 12, splined end 34 is exposed, and hollow tube 62 can be inserted into or removed from hollow rotor shaft 18. Ends 56 and 58 are of reduced diameter. The larger diameter of the hollow rotor shaft 18 between the ends 56 and 58 facilitates insertion and removal of hollow tube 62. The length of the hollow tube 62 is sufficient to extend from sealing surface 52 to sealing surface 54, and has a center portion 63 through which oil can flow. The hollow tube 62 is captured within the hollow rotor shaft 18 between shoulder 60 and a removable snap ring 64. The tube has channels 66 and 68 at ends 56 and 58, respectively, which extend circumferentially about tube 62. O-rings 70 and 72 disposed in channels 66 and 68 engage sealing surfaces 52 and 54, respectively.

An annular cavity 74, defined by inner surface 50 of hollow rotor shaft 18 and outer surface 76 of hollow tube 62, extends along the axis of hollow rotor shaft 18. Hollow tube 62 is provided with holes or sets of holes 78 which extend from center portion 63 of hollow tube 62 into cavity 74 for oil flow into cavity 74. The number of holes and the diameter of the holes control the oil pressure in cavity 74.

The oil pressure in cavity 74 is reduced from the oil pressure at inlet 32. When compared to a hollow rotor shaft 18 not having a hollow tube 62, the holes in hollow rotor shaft 18, as holes 36, 40 42 and 48, may be increased without significantly further reducing the oil pressure at inlet 32. The holes in hollow rotor shaft 18, being larger, are less sensitive to clogging from dirt and other contaminants.

Constant speed drive 12 has a hollow shaft 80 mounted for rotation in housing 14 by bearings 82. A hollow connector 84 is retained within hollow drive shaft 80 by a snap ring 86, and is sealed with the hollow shaft 80 by O-ring 88. Hollow connector 84 is of sufficient length to be received by hollow tube 62 at end 58 of hollow rotor shaft 18 when the generator 10 is coupled to the constant speed drive 12. End 90 of hollow connector 84 has a configuration which conforms to the hollow tube 62.

If it is desired to remove or interchange hollow tube 62 from generator 10, generator 10 and constant speed drive 12 are separated at the splined end 34, thereby exposing the hollow tube 62. Snap ring 64 is removed and hollow tube 62 may be slid axially outwardly from hollow rotor shaft 18. The hollow tube 62 may be replaced with a similar tube having a different configuration of holes.

Referring to FIGS. 2 and 3, tube 92 is shown perforated with a plurality of holes 78. The holes may be in sets (as seen in FIG. 3) equally spaced from each other, and extend along substantially the entire length of hollow tube 92. The holes in a set may be evenly spaced about the tube to minimize deflection during rotation. In all other respects, tube 92 is identical to tube 62, and may be interchanged with it.

A wide range of oil flow velocities and pressures can be achieved by the selection of the hole configurations in the hollow tubes. The flow requirements of generator 10 can remain constant when coupled to different constant speed drives or auxiliary power units having different inlet pressures of oil by the appropriate selection of the hole configuration in the hollow tube. Also, the oil flow rate through the generator can be changed to provide more or less flow therethrough by simply interchanging tubes having different hole configurations.

I claim:

1. A rotor shaft for an electrical machine comprising:
    a hollow rotor shaft having a plurality of holes therein for transmitting oil, a first and a second end, and sealing surfaces on an inner portion of the hollow rotor shaft at said first and second ends;
    a hollow tube within said hollow rotor shaft extending from the sealing surface at the first end to the sealing surface at the second end, thereby defining an annular cavity extending along the hollow shaft between the sealing surfaces;
    at least one hole extending through the hollow tube for transmitting oil from the inner surface of said tube to said annular cavity;
    a shoulder on the inner surface of the hollow rotor shaft adjacent said sealing surface at the first end; and
    a removable ring on the inner surface of the hollow rotor shaft adjacent said sealing surfaces at the second end, said ring and shoulder retaining the tube therebetween.

2. The rotor shaft of claim 1 wherein there is a plurality of holes extending through the hollow tube from substantially the first end to the second end.

3. The rotor shaft of claim 1 wherein there is a plurality of holes equally spaced about the hollow tube to minimize deflection of the tube during rotation.

4. The rotor shaft of claim 1 wherein said sealing surface on an inner portion of the hollow rotor shaft at said first and second ends is of a smaller diameter than the diameter of the inner portion of the hollow rotor shaft.

5. In a hollow rotor shaft having a first and a second end and mounted for rotation in an electrical machine, an inner bore for conducting oil and an outer surface carrying field winding structure and a rectifier assembly, said hollow rotor shaft having a plurality of holes positioned along the shaft for directing oil from said bore to said rectifier assembly and the field winding structure, the improvement comprising:
    sealing surfaces on said inner bore at said first and second ends;
    a hollow tube extending from the sealing surface on the first end to the sealing surface on the second end, said tube having a center portion for conducting oil from the first end to the second end, the outer surface of the tube and the inner bore of the hollow rotor shaft defining an annular cavity between said hollow tube and said inner bore of the hollow shaft;
    holes in said hollow tube extending from the center portion to the cavity; and
    a shoulder adjacent one sealing surface and a removable ring adjacent the other, said ring and shoulder retaining the hollow tube therebetween.

6. The hollow rotor shaft of claim 5 wherein the hollow tube has means for sealing the hollow tube with the sealing surfaces at said first and second ends.

7. The hollow rotor shaft of claim 6 wherein the means for sealing the hollow tube with the sealing surfaces at said first and second ends includes O-rings.

8. A rotor shaft for an electrical machine comprising:
   a hollow tube for conducting oil at a supply pressure, having a first and second end and sealing surfaces on the outer portion of said tube at said first and second ends;
   a hollow rotor shaft surrounding said hollow tube and extending from said sealing surface at said first end to said sealing surface at said second end thereby defining an annular cavity located between the outer surface of said tube and the inner surface of said rotor shaft and extending along the tube between said first and second sealing surfaces;
   at least one hole extending through the hollow tube for transmitting oil from said tube to said annular cavity and the number and size of the holes in said tube controlling the pressure of the oil in said annular cavity;
   a plurality of holes extending through said rotor shaft for directing oil from said cavity to said electrical machine;
   a shoulder on the inner surface of the hollow rotor shaft adjacent said sealing surface at the first end; and
   a removable ring on the inner surface of the hollow rotor shaft adjacent said sealing surface at the second end, said ring and shoulder retaining the tube therebetween.

9. The rotor shaft of claim 8 wherein there is a plurality of holes extending through the hollow tube from substantially the first end to substantially the second end.

10. The rotor shaft to claim 8 wherein there is a plurality of holes equally spaced about the hollow tube to minimize deflection of the tube during rotation.

11. The rotor shaft of claim 8 wherein the hollow tube has means for sealing the hollow tube with the sealing surface at said first and second ends.

12. The rotor shaft of claim 11 wherein the means for sealing the hollow tube with the sealing surface at said first and second ends includes O-rings.

* * * * *